(12) United States Patent
Mori et al.

(10) Patent No.: US 7,912,132 B2
(45) Date of Patent: Mar. 22, 2011

(54) MOVING IMAGE DECODING APPARATUS

(75) Inventors: Hirofumi Mori, Koganei (JP); Tatsunori Saito, Sagamihara (JP)

(73) Assignee: Kabushiki Kaisha TOSHIBA, Tokyo (JP)

( * ) Notice: Subject to any disclaimer, the term of this patent is extended or adjusted under 35 U.S.C. 154(b) by 1407 days.

(21) Appl. No.: 11/376,585

(22) Filed: Mar. 15, 2006

(65) Prior Publication Data

US 2006/0227878 A1 Oct. 12, 2006

(30) Foreign Application Priority Data

Apr. 11, 2005 (JP) ................................ 2005-113825

(51) Int. Cl.
*H04B 1/66* (2006.01)
*H04N 7/12* (2006.01)
*H04N 11/02* (2006.01)
*H04N 11/04* (2006.01)

(52) U.S. Cl. .................................................. 375/240.25
(58) Field of Classification Search .............. 375/240.25
See application file for complete search history.

(56) References Cited

U.S. PATENT DOCUMENTS

2002/0094027 A1* 7/2002 Sato et al. ................ 375/240.13
2004/0151248 A1* 8/2004 Kondo et al. ............ 375/240.16

FOREIGN PATENT DOCUMENTS

JP 10-262257 A 9/1998

OTHER PUBLICATIONS

IEEE Tranactions on Circuits and Systems for Video Technology, vol. 13, No. 7, Jul. 2003.
H. Mori et al; "One Examination of Reproduction Image Under Error Environment in H.264"; Technical Report of IEICE, IE2004-18, May 2004.
"Error Resilient Video Coding Techniques in International Standards", The Institute of Electronics, Information and Communication Engineers, vol. 83, No. 4: S. Fukunaga; Apr. 2000, pp. 317-320.
Japanese Office Action (and English translation thereof) dated Aug. 5, 2008, issued in a counterpart Japanese Application.

* cited by examiner

*Primary Examiner* — David C Payne
*Assistant Examiner* — Tanmay K Shah
(74) *Attorney, Agent, or Firm* — Holtz, Holtz, Goodman & Chick, PC

(57) ABSTRACT

Stream data is decoded for respective macroblocks to store decoded information in a memory, and an error is detected from the decoded information of each macroblock. As a result, if any error is detected, a plurality of pieces of decoded information of macroblocks ahead of the macroblock from which an error is detected are read out from the memory to check if the presence/absence of decoded information including a syntax that does not match rules. The macroblock in which an error mixed or a macroblock in which an error is estimated to mix is estimated based on the checking result, and a plurality of pieces of decoded information after the macroblock in which an error mixed are discarded based on the estimation result.

19 Claims, 6 Drawing Sheets

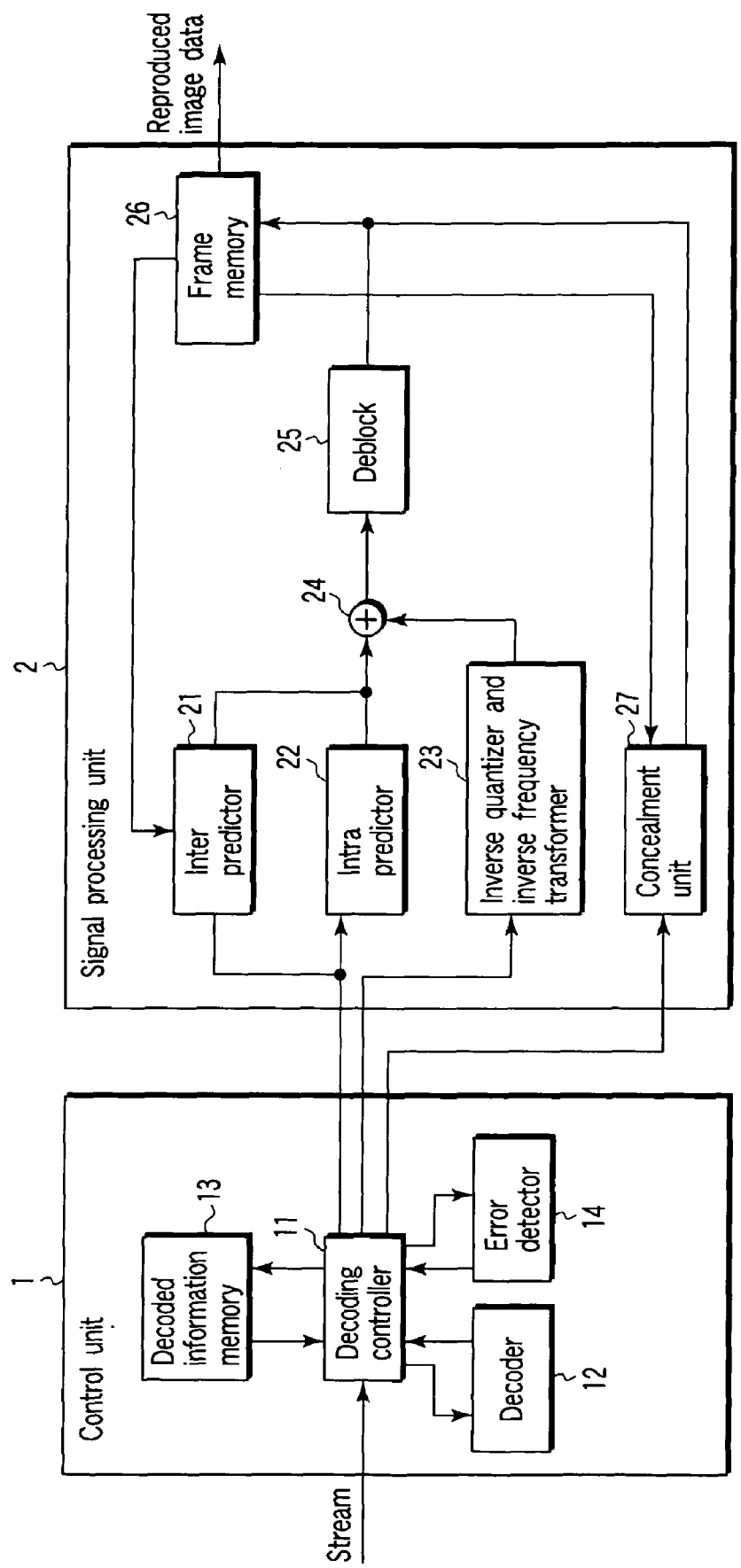
F I G. 1

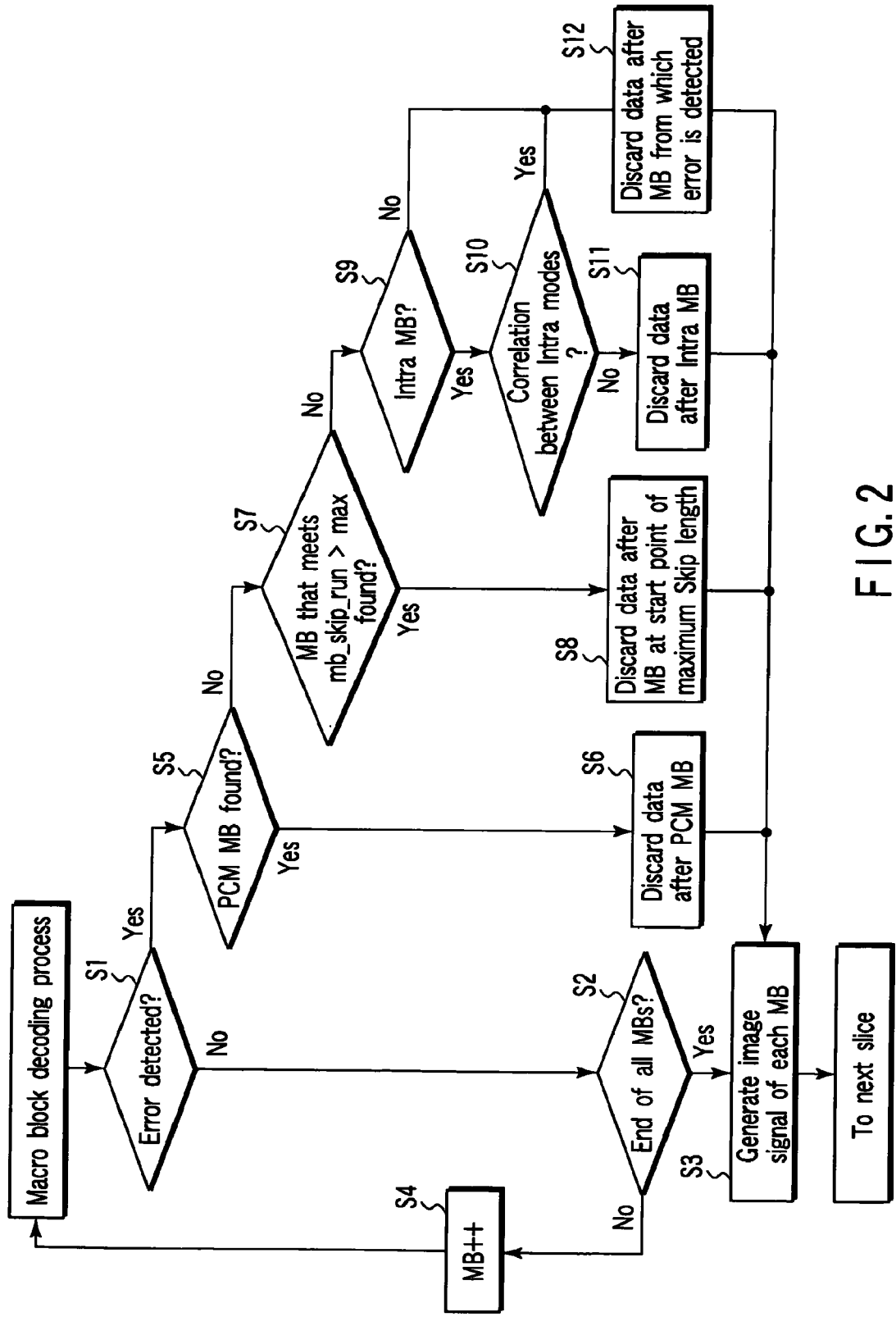
F I G. 2

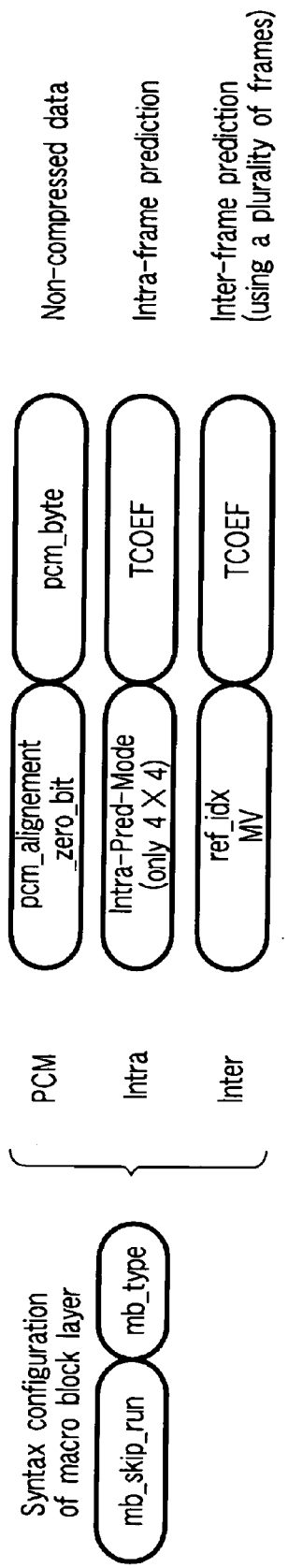
F I G. 3
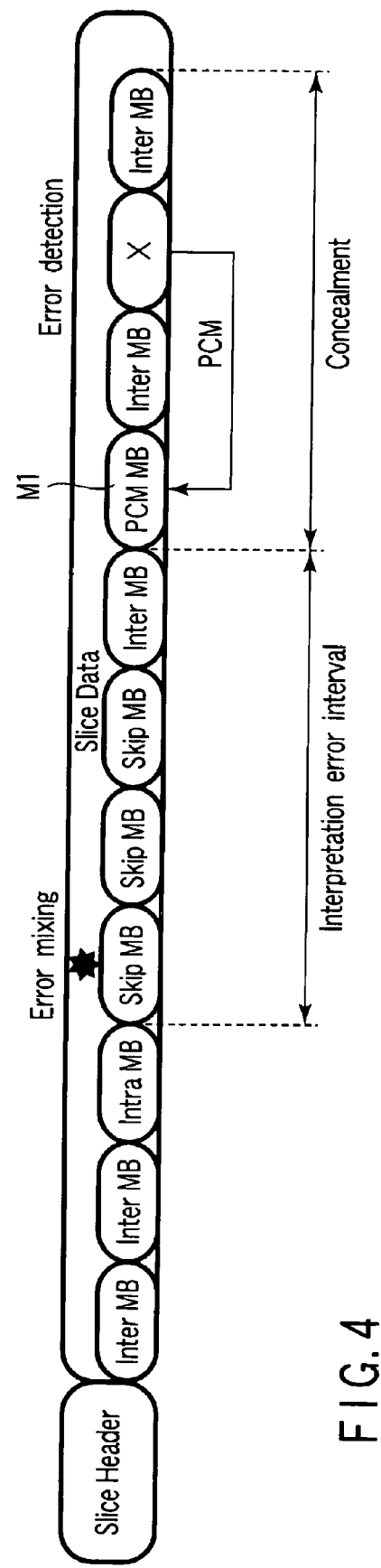
F I G. 4

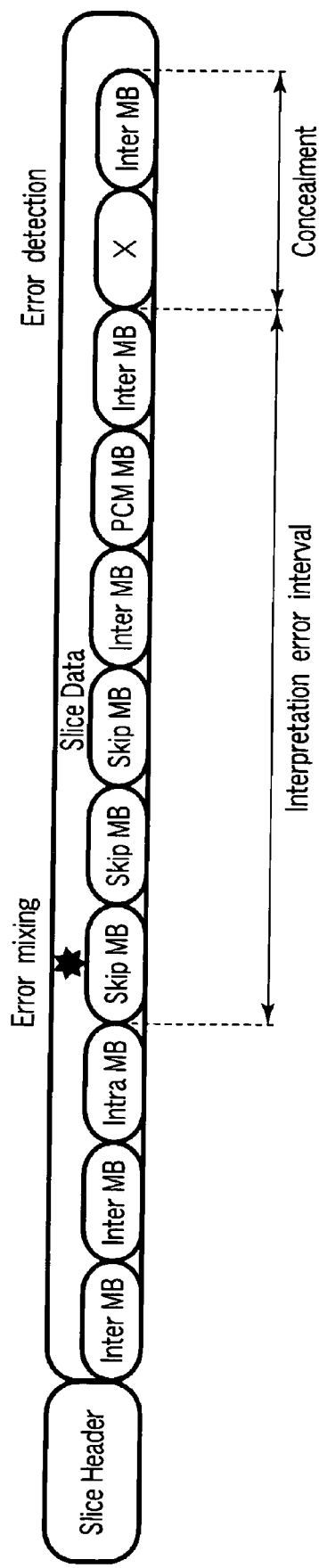
F I G. 7

Before improvement

Enlarged view

After improvement

MOVING IMAGE DECODING APPARATUS

CROSS-REFERENCE TO RELATED APPLICATIONS

This application is based upon and claims the benefit of priority from prior Japanese Patent Application No. 2005-113825, filed Apr. 11, 2005, the entire contents of which are incorporated herein by reference.

BACKGROUND OF THE INVENTION

1. Field of the Invention

The present invention relates to a moving image decoding apparatus which is equipped in a broadcast receiving terminal that receives, e.g., a digital broadcast signal for a mobile object using a ground wave, and a digital broadcast signal for a mobile object using a satellite.

2. Description of the Related Art

Modulation and demodulation techniques of video media have been increasingly progressing in recent years. This results from an increase in information volume due to higher qualities of moving image and audio data, and a higher demand for transmission of image information via networks due to development of wired or wireless networks.

Especially, since moving image data has a large volume, the moving image modulation and demodulation techniques are demanded to have high compression efficiency, high quality after demodulation, high transmission efficiency, and the like. As moving image modulation and demodulation techniques that meet such demands, a technique called ITU-T recommendation H.264/AVC (advanced video coding) (to be simply referred to as H.264 hereinafter) is known. The moving image modulation and demodulation techniques are disclosed in, e.g., IEEE Transactions on Circuits and Systems for Video Technology, Vol. 13, No. 7, July 2003, Overview of the H.264/AVC Video Coding Standard, Thomas Wiegand.

When H.264 AVC is applied to a ground wave digital broadcast system for a mobile object or a satellite mobile broadcast system, H.264 stream data is multiplexed in MPEG-2 systems together with information such as data broadcast data, and the like, and the multiplexed stream data is transmitted toward respective receiving terminals. However, when the receiving terminal is a mobile terminal such as a portable terminal, in-vehicle terminal, or the like, the receiving terminal is on the move. For this reason, reception of stream data in a stable radio wave environment is not always possible. Especially, in an environment in which a receiving terminal is in the shade of buildings and the like, errors mix in stream data at a high frequency of occurrence. Therefore, a moving image decoding apparatus equipped in a mobile terminal must have an error resilient function, and various examinations have been made (for example, Hiroshi Mori, Hirokazu Kawakatsu, & Masakazu Suzuki, "One examination of reproduction image under error environment in H.264", Technical Report of IEICE, IE2004-18, May, 2004").

However, most of examinations of error resilience techniques that have been made so far are intended for a concealment scheme of missing macroblocks (MB), and deterioration of image quality due to interpretation errors of a syntax that represents setting rules of an encoded data sequence and the like have not been sufficiently discussed.

BRIEF SUMMARY OF THE INVENTION

It is an object of the present invention to provide a moving image decoding apparatus which can reduce deterioration of image quality due to interpretation errors of macroblock data.

In order to achieve the above object, according to an aspect of a moving image decoding apparatus according to the present invention, stream data in which a plurality of macroblocks are multiplexed is demodulated for respective macroblocks, and its decoded information is stored in a memory. In addition, an error is detected from decoded information of each macroblock. If any error is detected, decoded information of each macroblock ahead of this macroblock from which the error is detected is read out from the memory to check the presence/absence of decoded information including a syntax that is not compliant with rules. Based on this checking result, a macroblock in which an error mixed or that in which an error is estimated to mix is estimated, thus discarding, based on the estimation result, decoded information after the macroblock in which the error mixed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing the functional arrangement of a moving image decoding apparatus according to the present invention;

FIG. 2 is a flowchart showing the demodulation control sequence and control contents in a decoding controller of the moving image decoding apparatus shown in FIG. 1;

FIG. 3 shows a syntax configuration of a macroblock layer defined in H.264;

FIG. 4 is a view for explaining an operation upon detection of a PCM macroblock by the moving image decoding apparatus shown in FIG. 1;

FIG. 7 is a view for explaining an operation when estimation processing of a macroblock in which an error mixed is not performed;

DETAILED DESCRIPTION OF THE INVENTION

Figure 5:
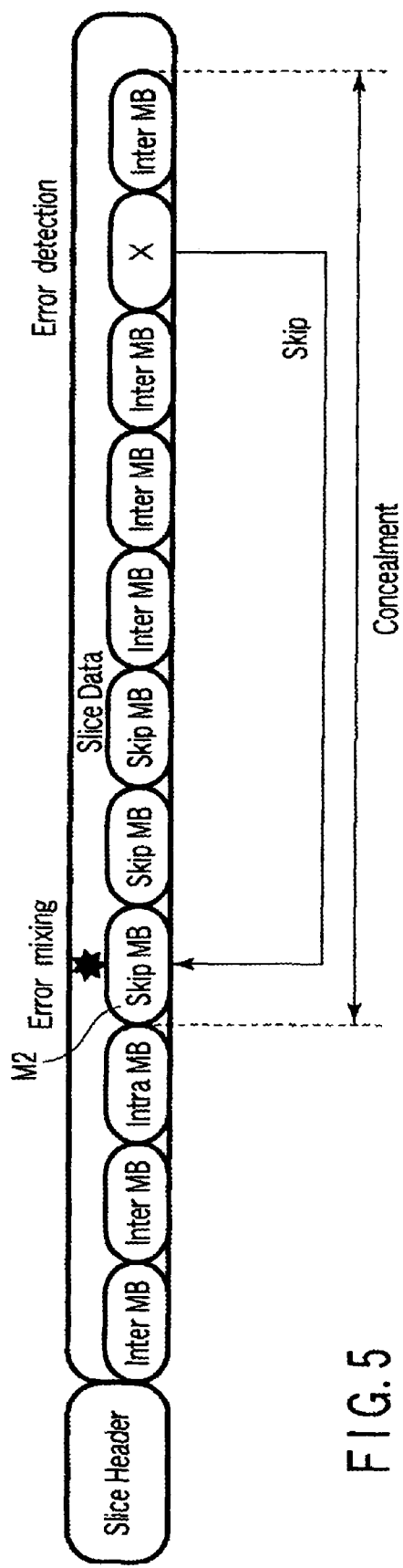
FIG. 5 is a view for explaining an operation upon detection of mb_skip_run with a length that exceeds an arbitrarily set maximum length by the moving image decoding apparatus shown in FIG. 1.

An overview of an embodiment of a moving image decoding apparatus according to the present invention will be explained first.

In the first aspect of the moving image decoding apparatus according to the present invention, stream data is demodulated for respective macroblocks and decoded information is stored in a memory. In addition, an error is checked and detected from decoded information of each macroblock. If any error is detected, decoded information of each macroblock ahead of this macroblock from which the error is detected is read out from the memory to check the presence/absence of decoded information including a syntax that is not compliant with rules. Based on this checking result, a macroblock in which an error mixed or that in which an error is estimated to mix is estimated, and decoded information after the macroblock in which the error mixed is discarded based on the estimation result.

Therefore, according to the first aspect, if any error is detected from a given macroblock, it is checked if each macroblock ahead of the macroblock from which the error is detected includes a syntax that is not compliant with rules. When a macroblock which includes a syntax that is not compliant with rules is found, this macroblock is estimated as a macroblock in which an error mixed or that in which an error is estimated to mix, thus discarding decoded information of the subsequent macroblocks.

For this reason, compared to a case wherein only decoded information of each of macroblocks after the macroblock from which an error is detected is discarded, an interpretation error interval from when an error mixes until that error is detected can be shortened. As a result, deterioration of image quality due to the interpretation error interval can be reduced. The estimation processing of a macroblock in which the error mixed and the processing for discarding macroblocks are done only when an error is detected. For this reason, no adverse influence such as a processing delay or the like is exerted on decoding processing free from any errors.

As estimation means of the macroblock in which an error mixed, various arrangements as follows may be used.

In the first arrangement, the presence/absence of a non-compressed macroblock is determined based on decoded information of macroblocks stored in a memory. If a non-compressed macroblock is found, that macroblock is estimated as a macroblock in which an error mixed or that in which an error is estimated to mix.

In general, in H.264, a non-compressed macroblock such as a pulse code modulation (PCM) macroblock is quite unlikely to exist in stream data. Therefore, if a non-compressed macroblock is found in the stream data, this can be considered as a macroblock in which an error mixed, and an interpretation error interval can be shortened by discarding macroblocks after this macroblock. If a macroblock in stream data changes to a non-compressed macroblock, if it is demodulated and reproduced intact, image quality deteriorates considerably. For this reason, by discarding the non-compressed macroblock, the image quality of a reproduction image can be greatly improved.

In the second arrangement, the presence/absence of a skip macroblock which defines a skip run length that exceeds an arbitrarily set upper-limit length is checked based on decoded information of macroblocks stored in a memory. If such macroblock is found, that macroblock is estimated as a macroblock in which an error mixed or that in which an error is estimated to mix. The upper-limit length is set based on the horizontal size of an image or a maximum skip length that appeared previously.

In H.264, a skip run length, i.e., control data (mb_skip_run) that represents the number of macroblocks to skip is inserted in the head of each macroblock. This skip run length is normally determined by the horizontal size of an image or the like. For this reason, if considerably large mb_skip_run that exceeds an arbitrarily set upper-limit length is detected, this macroblock can be considered as a macroblock in which an error mixed. By discarding decoded information of macroblocks after this macroblock, an interpretation error interval can be shortened.

In the third arrangement, the presence/absence of an intra-frame predicted macroblock in which the degree of correlation between prediction information of a luma component and those of chroma components is smaller than a predetermined threshold is determined. If such macroblock is found, that intra-frame predicted macroblock is estimated as a macroblock in which an error mixed or that in which an error is estimated to mix.

In H.264, intra-frame (intra) prediction modes are encoded independently for a luma component and chroma components. In general, the luma component and chroma components have correlation, and corresponding prediction modes also have correlation. If an intra-frame predicted macroblock which has no correlation between prediction modes corresponding to the luma component and chroma components is detected from those in stream data, this macroblock considered as a macroblock in which an error mixed. By discarding decoded information of macroblocks after this macroblock, the interpretation error interval can be shortened.

The second aspect of the moving image decoding apparatus according to the present invention comprises means or a processing sequence for, when decoded information of each of macroblocks after the estimated macroblock is discarded, concealing image data after the discarded macroblocks with reference to image data of previous related macroblocks.

In this way, image data of macroblocks even in the interpretation error interval from the macroblock in which mixing of an error is estimated until the macroblock from which an error is detected can be concealed in addition to macroblocks after error detection, thus shortening the interpretation error interval and further improving the image quality of a reproduction image.

An embodiment of the present invention will be described in detail below with reference to the accompanying drawings.

FIG. 1 is a functional block diagram showing an embodiment of a moving image decoding apparatus according to the present invention. The moving image decoding apparatus of this embodiment comprises a control unit 1 and signal processing unit 2. The control unit 1 has a microprocessor as a principal building component, and comprises a decoding controller 11, decoder 12, decoded information memory 13, and error detector 14. Of these units, the decoding controller 11, decoder 12, and error detector 14 are implemented all by executing programs by the microprocessor. The decoded information memory 13 comprises a random access memory (RAM). Note that the decoder 12 and error detector 14 may be implemented by a digital signal processor (DSP).

The decoder 12 demodulates stream data transferred from the decoding controller 11 for respective macroblocks, and returns decoded information for respective syntaxes to the decoding controller 11.

The decoded information memory 13 stores in turn decoded information of each macroblock obtained by the decoder 12 under the control of the decoding controller 11.

The error detector 14 determines the presence/absence of an error of the decoded information every time it receives the decoded information of the syntax from the decoding controller 11, and returns the determination result to the decoding controller 11.

The decoding controller 11 fetches stream data for respective macroblocks, controls the decoder 12 to decode the stream data, and controls the decoded information memory 13 to store the decoded information. Upon completion of decoding of one slice data, the decoding controller 11 supplies macroblocks stored in the decoded information memory 13 to one of an inter predictor 21, intra predictor 22, and inverse quantizer and inverse frequency transformer 23 in accordance with the types of macroblocks, and controls them to execute reproduction processing of image data.

The decoding controller 11 supplies the decoded information of each syntax obtained by the decoder 12 to the error detector 14 to determine the presence/absence of an error, and specifies a macroblock from which an error is detected based on the detection result. As a result of determination, if any error is detected from a given macroblock, the decoding controller 11 sequentially reads out a plurality of pieces of decoded information of macroblocks ahead of that macroblock from the decoded information memory 13. The decoding controller 11 determines the presence/absence of decoded information including a syntax that does not match rules for these pieces of readout decoded information, and estimates a macroblock in which an error mixed based on the determination result.

Furthermore, the decoding controller 11 discards a plurality of pieces of decoded information of macroblocks after the macroblock in which an error mixed from the decoded information memory 13 in accordance with the estimation result. The decoding controller 11 sends a concealment instruction of the discarded macroblocks to a concealment unit 27 of the signal processing unit 2 (to be described below).

On the other hand, the signal processing unit 2 comprises the inter predictor 21, the intra predictor 22, the inverse quantizer and inverse frequency transformer 23, a data composition unit 24, a deblock unit 25, a frame memory 26, and the concealment unit 27. Of these units, the inter predictor 21, intra predictor 22, inverse quantizer and inverse frequency transformer 23, data composition unit 24, deblock unit 25, and concealment unit 27 are implemented by executing signal processing by a DSP.

The frame memory 26 comprises a RAM, and stores reproduced frame image data as reference image data.

The inter predictor 21 calculates a prediction signal of an inter macroblock using the reference image data stored in the frame memory 26.

The intra predictor 22 calculates a prediction signal of an intra macroblock using a reference pixel in a frame, decoding of which is underway.

The inverse quantizer and inverse frequency transformer 23 applies inverse quantization and inverse frequency transformation processing to an input macroblock, thus calculating a residual error signal.

The data composition unit 24 composites signals calculated by the inter predictor 21, intra predictor 22, and inverse quantizer and inverse frequency transformer 23 to reproduce a macroblock.

The deblock unit 25 adaptively applies deblocking filter processing to the macroblock reproduced by the data composition unit 24, thus removing block distortion produced upon encoding of an image.

The concealment unit 27 conceals missing information due to an error or the like, and conceals image data of missing macroblocks based on those of other related macroblocks in accordance with an instruction from the decoding controller 11. As related information used in concealment processing, image data of macroblocks located around a macroblock to be concealed, and those of macroblocks located at identical positions in previous and next frames are used.

The operation of the moving image decoding apparatus with the aforementioned arrangement will be described below in accordance with the control sequence of the decoding controller 11. FIG. 2 is a flowchart showing the control sequence and control contents of the decoding controller 11.

When stream data is input, the decoding controller 11 fetches the stream data for respective macroblocks, controls the decoder 12 to decode the stream data, and controls the decoded information memory 13 to store their decoded information. The decoding controller 11 supplies decoded information of each syntax obtained by the decoder 12 to the error detector 14 to determine the presence/absence of an error. As a result of determination, if no error is detected in the syntax, the flow advances from step S1 to step S2 to check if all macroblocks of one slice data have been demodulated. If macroblocks to be decoded still remain, the decoding controller 11 selects the next macroblock in step S4, and executes the decoding control. After that, the decoding controller 11 repeats the demodulation control until the decoding processing for all macroblocks of one slice data is completed.

Upon completion of the decoding processing for all macroblocks of one slice data, the decoding controller 11 sequentially reads out macroblocks for one slice data stored in the decoded information memory 13, and supplies them to one of the inter predictor 21, intra predictor 22, and inverse quantizer and inverse frequency transformer 23 in accordance with their types.

As a result, the inter predictor 21, intra predictor 22, and inverse quantizer and inverse frequency transformer 23 calculate prediction signals and a residual error signal. The calculated prediction signals and residual error signal are composited by the data composition unit 24 to obtain reproduced image data of a macroblock. The reproduced image data undergoes deblocking filter processing by the deblock unit 25, thus removing block distortion produced upon modulation of an image. The reproduced image data that has undergone the deblocking filter processing is stored in the frame memory 26 as reference image data.

Assume that an error is detected in a given macroblock during the decoding processing. In this case, an error is more likely to mix in a macroblock ahead of the macroblock from which an error is detected. Hence, the decoding controller 11 sequentially reads out, from the decoded information memory 13, a plurality of pieces of decoded information of macroblocks ahead of the macroblock from which an error is detected, and executes processing for estimating a macroblock in which an error mixed based on the readout decoded information. The macroblock in which an error mixed is estimated in consideration of the use condition of an encoding tool unique to H.264 and the syntax configuration.

More specifically, in the syntax configuration of a macroblock layer, mb_skip_run indicating the number of macroblocks to be skipped is allocated at the head position, and mb_type indicating the type of a macroblock is allocated next, as shown in FIG. 3. The types of macroblocks include a PCM macroblock, intra macroblock, and inter macroblock. An intra macroblock is generated by intra-frame prediction, and an inter macroblock is generated by prediction among a plurality of frames, i.e., inter-frame prediction.

Of these macroblocks of various types, a PCM macroblock is non-compressed data, and such macroblock of non-compressed data is quite unlikely to exist in normal stream data. Therefore, when a PCM macroblock is found in stream data, it can be considered as a macroblock in which an error mixed.

As shown in FIG. 3, mb_skip_run indicating the number of macroblocks to be skipped is allocated at the head position of a macroblock. The number of macroblocks to be skipped is generally determined by the horizontal size of an image. Therefore, if the value of mb_skip_run exceeds an arbitrarily set upper-limit value, this macroblock can be considered as a macroblock in which an error mixed. Note that the upper-limit value is set based on the horizontal image size of an image, a maximum skip length that appeared so far, and the like.

Furthermore, prediction of a luma component and that of chroma components in an intra macroblock generally have correlation. If no correlation is found between prediction of the luma component and that of chroma components, this intra macroblock can be considered as a macroblock in which an error mixed. The presence/absence of correlation can be determined by setting a threshold, and checking if a correlation value between prediction of the luma component and that of chroma components is larger or smaller than the threshold. For example, if vertical prediction of the luma component and horizontal prediction of chroma components are combined, this state can be determined as a no-correlation state.

By focusing attention on the above points, the decoding controller 11 checks the presence/absence of a PCM macroblock in step S5, as shown in FIG. 2. As a result of checking, if a PCM macroblock is found, the decoding controller 11 determines that PCM macroblock as a macroblock in which an error mixed, and the flow advances to step S6 to discard macroblocks after that PCM macroblock.

FIG. 4 shows the configuration of stream data to explain the processing operation at that time. In this processing operation, macroblocks after a PCM macroblock M1 are discarded. Note that the discarded macroblocks are concealed by the concealment unit 27 (to be described later). Therefore, in this case, an interval after the PCM macroblock M1 of that after the macroblock in which an error mixed is concealed.

For this reason, the interval in which an interpretation error is likely to occur is limited to that from the macroblock in which an error mixed to the PCM macroblock M1. In this connection, when macroblocks after the macroblock in which an error is detected are discarded and concealed, as shown in FIG. 7, the interpretation error interval is prolonged, and the deterioration of image quality becomes considerable accordingly.

Figure 8A:
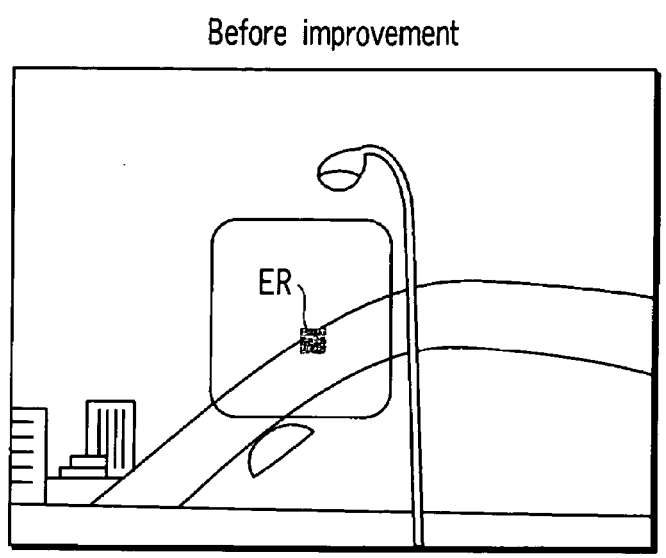
FIGS. 8A and 8B are views showing an example of image data when estimation processing of a macroblock in which an error mixed is not performed.
Figure 8B:
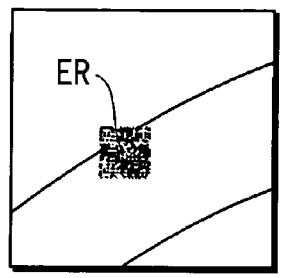
Figure 9:
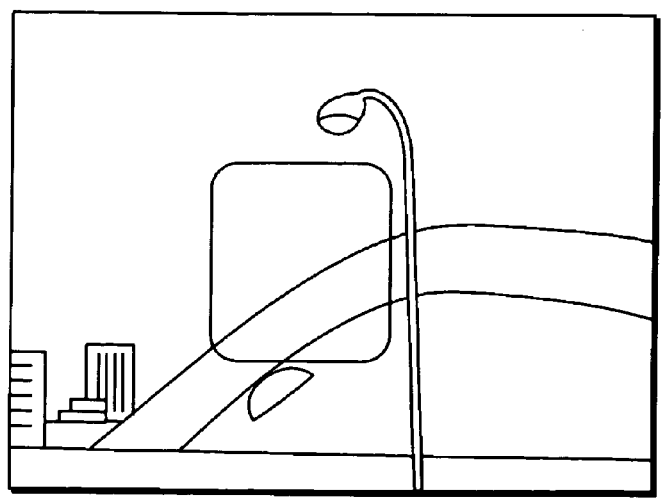
FIG. 9 is a view showing image data with improved image quality obtained by the moving image decoding apparatus shown in FIG. 1.

FIGS. 8A and 8B shows an example of reproduced image data that has undergone the error measure shown in FIG. 7. As shown in FIGS. 8A and 8B, if the PCM macroblock M1 remains without being discarded, image quality deterioration ER appears in a mosaic pattern at the position corresponding to this PCM macroblock M1. By contrast, when the PCM macroblock M1 is detected and macroblocks after the PCM macroblock M1 are discarded and then concealed like in this embodiment, reproduced image data free from any deterioration of image quality due to the PCM macroblock M1 can be obtained, as shown in FIG. 9.

On the other hand, assume that no PCM macroblock is found in step S5. In this case, the decoding controller 11 controls the flow to advance to step S7, and checks the presence/absence of a macroblock in which the value of mb_skip_run exceeds an arbitrarily set upper-limit value. As a result of this checking, if a macroblock in which the value of mb_skip_run exceeds the arbitrarily set upper-limit value is found, that macroblock is regarded as a macroblock in which an error mixed, and the flow advances to step S8 to discard macroblocks after that macroblock.

FIG. 5 shows the configuration of stream data to explain the processing operation at that time. In this processing operation, macroblocks after a Skip macroblock M2 in FIG. 5 are discarded, and the macroblocks in the interval are concealed by the concealment unit 27 (to be described later). Therefore, in this case, all macroblocks in the interval after the macroblock in which an error mixed are discarded and concealed. For this reason, an interval in which an interpretation error is likely to occur is removed, thus preventing deterioration of image quality due to mixing of an error.

Assume that no macroblock in which the value of mb_skip_run exceeds the arbitrarily set upper-limit value is found in step S7. In this case, the decoding controller 11 controls the flow to advance to step S9 to search for an intra macroblock. If an intra macroblock is found, the decoding controller 11 checks the presence/absence of correlation between intra modes in step S10. For example, the decoding controller 11 checks if correlation between prediction of a luma component and that of chroma components is larger than a threshold. As a result, if a macroblock which has no correlation between intra modes is found, the decoding controller 11 determines that intra macroblock as a macroblock in which an error mixed. The flow then advances to step S11, and the decoding controller 11 discards macroblocks after that intra macroblock.

Figure 6:
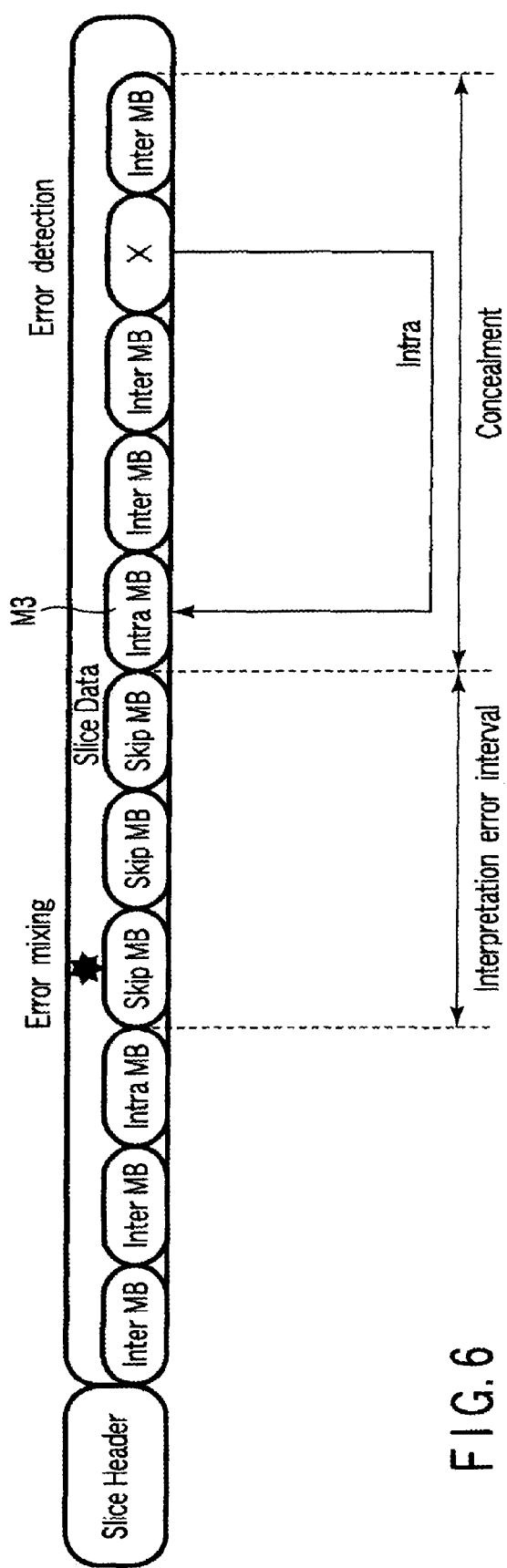
FIG. 6 is a view for explaining an operation upon detection of an intra macroblock in which luma and chroma prediction modes have no correlation by the moving image decoding apparatus shown in FIG. 1.

FIG. 6 shows the configuration of stream data to explain the processing operation at that time. In this processing operation, macroblocks in an interval after an intra macroblock M3 shown in FIG. 6 are discarded, and the macroblocks in the discarded interval are concealed by the concealment unit 27 (to be described later). Therefore, all macroblocks in the interval after the macroblock in which an error mixed are discarded and concealed. For this reason, an interval in which an interpretation error is likely to occur is removed, thus preventing deterioration of image quality due to mixing of an error.

Furthermore, if it is determined in step S9 that no intra macroblock is found or if it is determined in step S10 that the found intra macroblock has correlation between intra modes, the flow advances to step S12, and the decoding controller 11 discards macroblocks after the macroblock from which an error is detected.

Upon completion of the estimation processing of the macroblock in which an error mixed, and the discard processing of macroblocks after the estimated macroblock, the decoding controller 11 instructs the concealment unit 27 to conceal the discarded macroblocks. The concealment unit 27 selectively reads out, from, e.g., the frame memory 26, image data of macroblocks located around a macroblock to be concealed, or image data of macroblocks located at identical positions in the previous and next frames, and conceals the macroblock to be concealed based on the readout image data.

As described above, according to this embodiment, the error detector 14 determines the presence/absence of an error for the decoded syntax information decoded by the decoder 12. When any error is detected, a plurality of pieces of decoded information of macroblocks ahead of the macroblock from which an error is detected is sequentially read out from the decoded information memory 13. The decoding controller 11 checks the presence/absence of a PCM macroblock, that of a macroblock in which mb_skip_run exceeds an arbitrarily set upper-limit value, and that of a macroblock having no correlation between intra modes. If such macroblock is found, the decoding controller 11 estimates that macroblock as a macroblock in which an error mixed. Then, the decoding controller 11 discards macroblocks after the estimated macroblock from the decoded information memory 13, and conceals the discarded macroblocks using the concealment unit 27.

That is, macroblocks after the macroblock which is estimated as the macroblock in which an error mixed are discarded, and are then concealed. For this reason, compared to a case wherein only a plurality of pieces of decoded information of macroblocks after the macroblock from which an error is detected are discarded, an interpretation error interval from when an error mixed until that error is detected can be shortened, thus reducing deterioration of image quality due to the interpretation error interval.

In this embodiment, the estimation processing of the macroblock in which an error mixed and the processing for discarding macroblocks are executed only when any error is detected. For this reason, no adverse influence such as a processing delay or the like is exerted on decoding processing free from any errors.

Note that the present invention is not limited to the above embodiment. For example, in the above embodiment, the presence/absence of a PCM macroblock, that of a macroblock in which mb_skip_run exceeds an arbitrarily set upper-limit value, and that of a macroblock having no correlation between intra modes are checked to estimate a block in which an error mixed. However, not all these checking processes need be executed, and at least one of these processes may be executed.

In the above embodiment, the estimation processing of the macroblock in which an error mixed, the processing for discarding macroblocks, and the like are implemented by executing programs by the microprocessor. However, these processes may be implemented by hardware. In addition, the format of stream data, the arrangements of the control unit and signal processing unit, the contents of the concealment processing, and the like can be carried out by variously modifying them without departing from the scope of the present invention.

In brief, the present invention can be embodied by modifying required constituent elements without departing from the scope of the invention when it is practiced. Also, various inventions can be formed by appropriately combining a plurality of required constituent elements disclosed in the respective embodiments. For example, some required constituent elements may be omitted from all required constituent elements disclosed in the respective embodiments. Furthermore, required constituent elements of different embodiments may be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A moving image decoding apparatus comprising:
    a decoder configured to decode stream data in which a plurality of macroblocks are multiplexed and output decoded syntax information;
    a memory configured to store the decoded syntax information of each macroblock output from the decoder;
    a detector configured to detect an error mixed in the stream data due to an external factor, for the decoded syntax information of each macroblock output from the decoder;
    an estimator configured to read out a plurality of pieces of the decoded syntax information of a plurality of macroblocks ahead of a macroblock from which the error is detected, to determine presence/absence of a macroblock that is unlikely to be present in normal stream data, based on the read out decoded syntax information, and to estimate that the macroblock that is unlikely to be present in normal stream data is an initial macroblock in which the error mixed; and
    a decoding controller configured to discard decoded syntax information that succeeds the initial macroblock in which the error mixed, from the decoded syntax information of each of the macroblocks stored in the memory.

2. The apparatus according to claim 1, wherein the estimator determines presence/absence of a non-compressed macroblock based on the read out plurality of pieces of decoded syntax information of the macroblocks, and if a non-compressed macroblock is found, the estimator estimates that the non-compressed macroblock is the initial macroblock in which the error mixed.

3. The apparatus according to claim 2, wherein the estimator determines presence/absence of a Pulse Code Modulation (PCM) macroblock based on the read out plurality of pieces of decoded syntax information of the macroblocks, and if a PCM macroblock is found, the estimator estimates that the PCM macroblock is the initial macroblock in which the error mixed.

4. The apparatus according to claim 1, wherein the estimator determines presence/absence of a skip macroblock that defines a skip run length which exceeds an arbitrarily set upper-limit length based on the read out plurality of pieces of decoded syntax information of the macroblocks, and if a corresponding skip macroblock is found, the estimator estimates that the skip macroblock is the initial macroblock in which the error mixed.

5. The apparatus according to claim 4, wherein the estimator extracts mb_skip_run from each of the read out plurality of pieces of decoded syntax information of the macroblocks, compares the extracted mb_skip_run with the upper-limit length, and estimates a macroblock to be the initial macroblock in which the error mixed when the mb_skip_run of the macroblock is larger than the upper-limit length.

6. The apparatus according to claim 1, wherein the estimator determines presence/absence of an intra-frame predicted macroblock in which a degree of correlation between prediction information of a luma component and prediction information of chroma components is less than a predetermined threshold based on the read out plurality of pieces of decoded syntax information of the macroblocks, and if a corresponding intra-frame predicted macroblock is found, the estimator estimates that the intra-frame predicted macroblock is the initial macroblock in which the error mixed.

7. The apparatus according to claim 1, further comprising:
    a concealment unit configured to conceal image data of the macroblocks whose syntax information is discarded, with reference to image data of previous related macroblocks.

8. A moving image decoding method for a moving image decoding apparatus, the method comprising:
    decoding stream data in which a plurality of macroblocks are multiplexed and outputting decoded syntax information;
    storing the decoded syntax information of each macroblock in a memory;
    detecting an error mixed in the stream data due to an external factor, for the decoded syntax information of each macroblock;
    reading out a plurality of pieces of the decoded syntax information of a plurality of macroblocks ahead of a macroblock from which the error is detected, determining presence/absence of a macroblock that is unlikely to be present in normal stream data, based on the read out decoded syntax information, and estimating that the macroblock that is unlikely to be present in normal stream data is an initial macroblock in which the error mixed; and discarding decoded syntax information that succeeds the initial macroblock in which the error mixed, from the decoded syntax information of each of the macroblocks stored in the memory.

9. The method according to claim 8, wherein presence/absence of a non-compressed macroblock is determined based on the read out plurality of pieces of decoded syntax information of the macroblocks, and if a non-compressed macroblock is found, it is estimated that the non-compressed macroblock is the initial macroblock in which the error mixed.

10. The method according to claim 9, wherein presence/absence of a Pulse Code Modulation (PCM) macroblock is determined based on the read out plurality of pieces of decoded syntax information of the macroblocks, and if a PCM macroblock is found, it is estimated that the PCM macroblock is the initial macroblock in which the error mixed.

11. The method according to claim 8, wherein presence/absence of a skip macroblock that defines a skip run length which exceeds an arbitrarily set upper-limit length is determined based on the read out plurality of pieces of decoded syntax information of the macroblocks, and if a corresponding skip macroblock is found, it is estimated that the skip macroblock is the initial macroblock in which the error mixed.

12. The method according to claim 11, wherein mb_skip_run is extracted from each of the plurality of pieces of decoded syntax information of the macroblocks stored in the memory, the extracted mb_skip_run is compared with the upper-limit length, and a macroblock is estimated to be the initial macroblock in which the error mixed when the mb_skip_run of the macroblock is larger than the upper-limit length.

13. The method according to claim 8, wherein presence/absence of an intra-frame predicted macroblock in which a degree of correlation between prediction information of a luma component and prediction information of chroma components is less than a predetermined threshold is determined based on the read out plurality of pieces of decoded syntax information of the macroblocks, and if a corresponding intra-frame predicted macroblock is found, it is estimated that the intra-frame predicted macroblock is the initial macroblock in which the error mixed.

14. The method according to claim 8, further comprising concealing image data of the macroblocks whose syntax information is discarded, with reference to image data of previous related macroblocks.

15. A mobile communication terminal comprising:
a receiver configured to receive, by wireless communication, stream data in which image data encoded in units of macroblocks are multiplexed and which corresponds to at least one macroblock;
a decoder configured to decode the received stream data and output decoded syntax information;
a memory configured to store the decoded syntax information of each macroblock output from the decoder;
a detector configured to detect an error mixed in the stream data due to an external factor, for the decoded syntax information of each macroblock output from the decoder;
an estimator configured to read out a plurality of pieces of the decoded syntax information of a plurality of macroblocks ahead of a macroblock from which the error is detected, to determine presence/absence of a macroblock that is unlikely to be present in normal stream data, based on the readout decoded syntax information, and to estimate that the macroblock that is unlikely to be present in normal stream data is an initial macroblock in which the error mixed; and
a decoding controller configured to discard decoded syntax information that succeeds the initial macroblock in which the error mixed, from the decoded syntax information of each of the macroblocks stored in the memory.

16. The terminal according to claim 15, wherein the estimator determines presence/absence of a Pulse Code Modulation (PCM) macroblock based on the read out plurality of pieces of decoded syntax information of the macroblocks, and if a PCM macroblock is found, the estimator estimates that the PCM macroblock is the initial macroblock in which the error mixed.

17. The terminal according to claim 15, wherein the estimator determines presence/absence of a skip macroblock that defines a skip run length which exceeds an arbitrarily set upper-limit length based on the read out plurality of pieces of decoded syntax information of the macroblocks, and if a corresponding skip macroblock is found, the estimator estimates that the skip macroblock is the initial macroblock in which the error mixed.

18. The terminal according to claim 17, wherein the estimator extracts mb_skip_run from each of the plurality of pieces of decoded syntax information of the macroblocks stored in the memory, compares the extracted mb_skip_run with the upper-limit length, and estimates a macroblock to be the initial macroblock in which the error mixed when the mb_skip_run of the macroblock is larger than the upper-limit length.

19. The terminal according to claim 15, wherein the estimator determines presence/absence of an intra-frame predicted macroblock in which a degree of correlation between prediction information of a luma component and prediction information of chroma components is less than a predetermined threshold based on the read out plurality of pieces of decoded syntax information of the macroblocks, and if a corresponding intra-frame predicted macroblock is found, the estimator estimates that the intra-frame predicted macroblock is the initial macroblock in which the error mixed.

* * * * *